Aug. 14, 1951  D. PETERSON  2,564,029
NUT AND BOLT CONSTRUCTION
Filed April 11, 1947
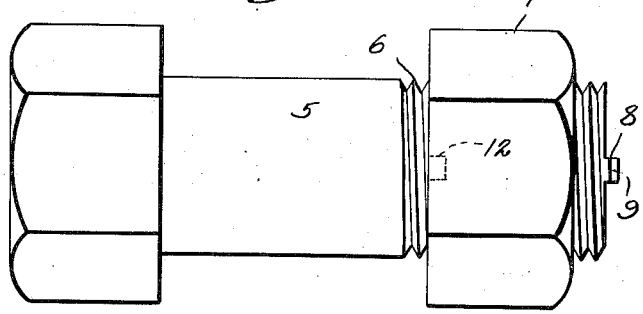
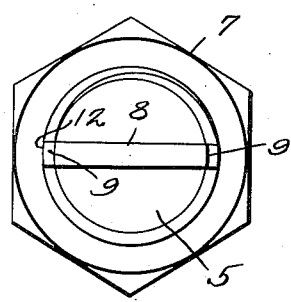
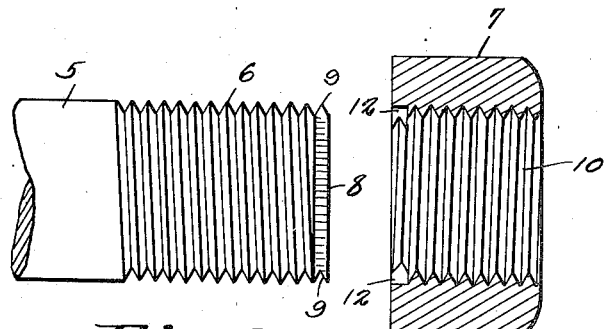
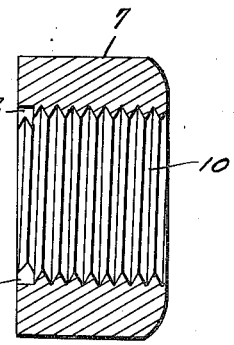
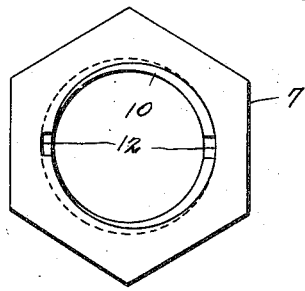
Dana Peterson
INVENTOR
BY
ATTORNEYS Patented Aug. 14, 1951

2,564,029

UNITED STATES PATENT OFFICE 2,564,029

NUT AND BOLT CONSTRUCTION

Dana Peterson, Oakland, Calif.

Application April 11, 1947, Serial No. 740,875

1 Claim. (Cl. 85—1)

This invention relates to a nut and bolt construction, the primary object of the invention being to provide a nut and bolt constructed in such a way that the nut may be readily and easily positioned, for true threading on the bolt.

Another object of the invention is to provide means for guiding a nut to the bolt, to the end that the nut may be positioned in the dark, lessening the danger of stripping the threads of the bolt with the application of a wrench or similar tool for rotating the nut on the bolt.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing:

Figure 1 is an elevational view of a bolt and nut constructed in accordance with the invention.

Figure 2 is an end elevational view thereof.

Figure 3 is an elevational view illustrating the threaded end of a bolt.

Figure 4 is a sectional view through the nut.

Figure 5 is a bottom plan view of the nut.

Referring to the drawing in detail, the reference character 5 indicates a bolt, which is formed with the usual threaded section 6, on which the nut 7 is positioned.

The bolt is provided with a rib 8 that extends transversely thereacross, the rib being provided with threads 9 at its ends. This rib 8 extends beyond the end of the bolt, the ends or threaded portions thereof, being designed to cooperate with the threads 10 of the nut 7. The nut 7 is formed with recesses 12, formed in the wall thereof adjacent to the inner end of the nut, the recess being formed at the ends of the threads, so that the threads of the rib over which the nut is positioned, will move into the recess, holding the nut in its proper position for true threading on the bolt. It is obvious that when the nut has been positioned as described, and rotated, the threads of the nut and bolt will cooperate to feed the nut along the threads of the bolt.

It has been found in practice that with this structure, a nut may be applied in the dark lessening the chances of stripping the threads of the bolt or nut, when the nut is rotated by means of a tool, in tightening the nut home.

Having thus described the invention, what is claimed is:

A nut and bolt comprising a bolt having a threaded section and a threaded nut adapted to be mounted thereon, a rib integral with the bolt and extending transversely of the end of the bolt, said rib having threads at its ends in phase with the remaining bolt threads, said nut having internal threads and having recesses formed adjacent to the inner ends of the threads, said recesses being spaced a circumferential distance corresponding to the ends of the rib, the recesses being free of threads and intercepting the threads of the nut providing a guide adapted to simultaneously accommodate the ends of the rib automatically placing the threads of the nut and bolt in phase to guide the nut to the threaded section of the bolt.

DANA PETERSON.

REFERENCES CITED

The following references are of record in the file of this patent:

UNITED STATES PATENTS

| Number | Name | Date |
|---|---|---|
| 447,775 | Higbee | Mar. 10, 1891 |
| 998,290 | Hanson et al. | July 18, 1911 |
| 1,339,015 | Blake | May 4, 1920 |